United States Patent Office 3,629,368
Patented Dec. 21, 1971

3,629,368
PROCESS FOR PRODUCING MODIFIED PROPYLENE POLYMER
Junichi Fukuda, Kijuro Tashiro, Mutsuo Sennari, and Kenjiro Nagashima, Yokkaichi-shi, Japan, assignors to Mitsubishi Petrochemical Co., Ltd., Tokyo, Japan
No Drawing. Continuation of application Ser. No. 433,487, Feb. 17, 1965. This application Aug. 18, 1969, Ser. No. 853,591
Claims priority, application Japan, Feb. 20, 1964, 39/8,785
Int. Cl. C08f 15/04, 1/42
U.S. Cl. 260—878 B                       5 Claims

ABSTRACT OF THE DISCLOSURE

Modified propylene polymer is provided having improved impact resistance and toughness at low temperature as well as having a high softening point and stiffness. The modified propylene polymer is produced by a process of polymerizing a member of the group consisting of propylene and ethylene and subsequently polymerizing continuously in the same system the other member of said group, said polymerization being effected at a temperature of 30–100° C., at a pressure of from 1–10 atmospheres and utilizing as catalysts dialkylaluminum monohalide and titanium trichloride, the polymerization of ethylene being effected in the presence of an average amount of from 0–25% by volume of propylene and the amounts of ethylene and propylene fed to the reaction system being adjusted so that the resulting modified propylene polymer contains from 5 to 40% by weight ethylene.

---

This application is a continuation of application S.N. 433,487, filed Feb. 17, 1965, now abandoned.

This invention relates to a process for producing solid crystalline modified propylene polymer having excellent impact resistance and toughness at low temperature as well as having a high softening point and stiffness.

While the crystalline polypropylene produced by the conventional processes has various excellent mechanical properties at room temperature and above, its impact resistance at temperatures below room temperature is considerably low. Further, the brittle temperature of crystalline polypropylene falling within the molecular weight range in which molding thereof is made normally possible exhibits a value of 10–30° C.

In view of this fact, the shaped articles obtained from crystalline polypropylene are relatively brittle. Hence, being limited as to the end products for which use can be made, it is exceedingly inconvenient.

As known means for improving the brittleness at low temperatures of crystalline polypropylene, are the process of block copolymerization of propylene with other olefines, and particularly ethylene, and the process of blending it with other resins or elastomers. However, researches by us have shown that the properties of the modified polypropylene obtained by these prior art processes cannot be regarded as being fully satisfactory as yet.

It is therefore an object of the present invention to provide an excellent modified propylene polymer which has a high softening point and stiffness as well as impact resistance and toughness at low temperatures.

Another object of the invention is to provide a polymerization process by which the modified propylene polymer having the aforementioned excellent properties can be produced in good yield and with relatively easy procedures.

Other objects of the invention will be apparent from the following description.

The process for producing modified propylene polymer of the present invention comprises polymerizing propylene and ethylene at a temperature of 30–100° C. and a pressure of 1–10 atmospheres using as catalysts dialkylaluminum monohalide and titanium trichloride, characterized in that when the propylene has been polymerized first, the polymerization of the ethylene follows, and on the other hand, when the ethylene has been polymerized first, the polymerization of the propylene follows, said polymerizations being carried out continuously in the same system, the polymerization of the ethylene being carried out in the presence of an average of 0–25% by volume of propylene during the time it is being polymerized, the amounts fed to the reaction system of said ethylene and propylene being so adjusted that the resulting polymer as a whole contains 5–40% by weight of ethylene.

Hence, in practicing the present invention, either one of the following modes A and B may be adopted.

(A) First, propylene is fed to the reaction system, and then, as previously described, the polymerization of the propylene is carried out at a temperature of 30–100° C. and a pressure of 1–10 atmospheres, in the presence of titanium trichloride and dialkylaluminum monohalide, following which the polymerization of ethylene is carried out in the same reaction system under conditions of the above temperature and pressure range. The polymerization of the ethylene is carried out in the presence of propylene averaging 0–25% by volume during the time the ethylene is being polymerized.

(B) The sequence in which the monomers are fed to the reaction system differs from the hereinabove described mode A in that ethylene or ethylene and propylene are fed to the reaction system first, the propylene content being such as to average 0–25% by volume during the time the ethylene is polymerized, and the polymerization of the ethylene or ethylene and propylene is carried out under the same conditions with respect to catalyst, pressure and temperature as in the case of the hereinabove described mode A; following which propylene is fed to the same reaction system and polymerized therein under the same conditions as to the reaction temperature and pressure range as indicated hereinabove.

In any event, according to the present invention, the proportion in which the propylene and ethylene are fed to the reaction system in either of the foregoing modes A or B is so adjusted that the ethylene content of the polymer is 5–40% by weight, based on the resulting polymer as a whole.

For sake of simplicity, the invention process will be fully described with reference to the foregoing mode A of the invention.

According to the mode A of this invention, the foregoing two catalyst components are suspended in an autoclave in an inert aliphatic alicyclic or aromatic hydrocarbon or a mixture thereof, and the polymerization of the propylene is carried out at a temperature of 30–100° C. and preferably 40–80° C. and a pressure of 1–10 atmospheres. If desired, a suitable amount of hydrogen may be incorporated in the polymerization system at this time for lowering the degree of polymerization of the resulting polypropylene. Further, preferably the polymerization of propylene is continued in this case until the formation of the crystalline polypropylene amounts to 300–700 parts per each part by weight of the titanium trichloride. The polymerization of ethylene is then carried out in the same reaction system as hereinabove described at a temperature and pressure range identical to that used in polymerizing the propylene. In the case of the polymerization of ethylene, the content in the autoclave of the ethylene and propylene are made to be (as average values from the start of the polymerization of the ethylene to its completion) 75–100% by volume of the former to 25–0% by volume of the latter. Thus, according to the present invention, the polymerization of ethylene is carried out either with ethylene alone or in the presence of not more than 25% by volume of propylene (as an average value during the total polymerization of the ethylene). The polymerization of ethylene is thus continued until the content of ethylene in the whole polymer becomes 5–40% by weight. While as a molecular weight modifier hydrogen may be caused to be present during the polymerization of the ethylene, it is preferred that the introduction of hydrogen be avoided at the start of the polymerization of the ethylene and be carried out 10–20 minutes after the start of the polymerization of the ethylene. The reason is that it has been found by means of experiments that the effects of improvement in the property definitely suffer when hydrogen is introduced from the start of the polymerization than when introduced later. Namely, when the ethylene content in the whole polymer is less than about 5% by weight, the improvement in the performance at low temperatures is insufficient. On the other hand, when the ethylene content is above about 40% by weight, not only a decline in the softening point takes place but the other desirable properties of crystalline polypropylene are impaired. Thus, according to the present invention, it is to be especially preferred that the polymerization reaction be carried out in such a manner as to ensure that the ethylene content in the polymer as a whole becomes 8–30% by weight.

The polymeric slurry formed upon completion of the polymerization reaction can be purified and a solid polymer obtained therefrom by the same method as in the case of the conventional crystalline polypropylene slurry.

The hereinbefore described reaction conditions and procedures are applicable without change in practicing mode B.

The reason the polymerization of ethylene is carried out in this invention in the presence of propylene averaging 0–25% by volume for the whole of the polymerization time of the ethylene is as follows:

It was found that if the ethylene occupied on the average of above 75% (the remainder being propylene) of the gas composition of the vapor phase portion of the autoclave during the ethylene polymerization stage in this invention, the ethylene content in the ethylene-propylene random copolymer formed would be above 90% by weight and that this copolymer would become a crystalline copolymer insoluble in a hydrocarbon solvent at room temperature. While a detailed description of the composition of the modified propylene polymer obtained by the invention process will be given later, in the hereinabove described case, the foregoing ethylene-propylene copolymer or polyethylene, either, as such, or after block polymerizing with a part of the polypropylene molecules, is contained in the resulting polymer, and hence the properties of the polypropylene are greatly improved by their presence. And according to our researches, it was found that when the polymerization of ethylene in the ethylene polymerization stage of the present invention was carried out under the conditions wherein propylene is present in an amount of 5–20% by volume as an average value throughout the polymerization of ethylene from its start to completion, a modified propylene polymer having especially excellent properties could be obtained.

Thus, the final product of this invention, the modified propylene polymer obtained by carrying out the ethylene polymerization stage in the presence of propylene in an amount of 0–25% by volume, and preferably 5–20% by volume, as an average value throughout the polymerization of the ethylene from its start to completion, contains as much as 93–97% of solid polymer. Further, the proportion of the residue after extraction with boiling n-heptane becomes about 92–96%.

Again, if the propylene which is present in the ethylene polymerization stage averages more than 25% by volume during the time the ethylene is polymerized, the resulting ethylene-propylene random copolymer becomes soluble in hydrocarbon solvents. Hence, not only does the yield of the product decline but also with an increase in the viscosity of the polymeric slurry difficulty arises in the transportation and centrifuging operations during the step of recovering the solid crystalline polymer from the polymeric slurry. In addition, the effects of improvement in properties of the product polymer suffer. Therefore, it is one of the important features of this invention to ensure that the rate at which propylene is present in the mixture during the ethylene polymerization stage is, as previously indicated, an amount, ranging between zero and 25% by volume, and preferably between 5 and 20% by volume.

As the catalyst to be used in the polymerization reaction of the present invention, the catalyst combination of particularly titanium trichloride and dialkylaluminum monohalide of the so-called Ziegler-Natta catalysts must be used. Surprisingly, the polymer obtained by the use of the typical Ziegler-Natta catalyst, the combination of titanium trichloride and trialkylaluminum, exhibited a great decline in the softening temperature as well as a pronounced impairment of the various desirable properties of crystalline polypropylene. Moreover, the impact resistance at low temperatures was also far inferior to that of the polymer of this invention. Consequently, such a catalyst cannot be used.

The term "titanium trichloride" as used herein comprehends not only that obtained by reducing titanium tetrachloride with hydrogen but also that obtained by reducing titanium tetrachloride with metallic aluminum or alkyl aluminum or that obtained by treating these with a suitable means such as heat treatment and/or comminution.

Further, in practicing this invention, it is preferred that the polymerization reaction be so conducted that (1) at least 300 parts by weight of the final solid polymer (modified propylene polymer) are formed per each part by weight of the foregoing titanium trichloride, one of the components of the catalyst; and (2) the intrinsic viscosity of the polyethylene and/or ethylene-propylene fraction in the final modified propylene polymer is greater than the intrinsic viscosity of the polypropylene fraction in said final polymer. The reason is that by conducting the polymerization reaction as in item (1), above, the yield of the modified propylene polymer per unit weight of the catalyst (catalytic efficiency) is not only enhanced, but also the properties of the resulting modified propylene polymer, particularly its softening point and impact resistance, are enhanced to a greater extent than when the catalytic efficiency is lower than indicated above. This fact will be readily understood by a comparison of items Nos. 1 and 2 (instances where the catalytic efficiency is less than 300) and items Nos. 3 and 4 (instances where the catalytic efficiency is above 300) of the hereinafter presented Table I of Example 1.

On the other hand, by conducting the polymerization reaction as described in item (2), above, the impact resistance of the resulting modified propylene polymer can likewise be improved.

Next, the composition of the modified propylene polymer obtained by the invention process will be described.

When propylene is present in the ethylene polymerization stage in the invention process, the resulting modified propylene polymer is believed to be composed principally of polypropylene (a), a random copolymer of propylene and ethylene (b), and block copolymer of said random copolymer and polypropylene (c). On the other hand, in the absence of propylene in said ethylene polymerization stage, the resulting modified propylene polymer is believed to be composed principally of polypropylene (a), polyethylene (d) and a block copolymer of polypropylene and polyethylene (e).

It was confirmed by the following method that the composition of a typical polymer produced by the process of the present invention contained the three molecular chains of (a), (b) and (c), hereinbefore indicated.

Namely, said polymer was first separated into six fractions by a solvent extraction method similar to such as that described, for example, by P. W. O. Wijga [Makromolekulare Chemie, vol. 36, p. 115 (1960)] or by P. Parrini [Makromolekulare Chemie, vol. 38, p. 27 (1960)]. According to the solvent extraction method, as referred to herein, first, the hot tetralin solution (160° C.) of said polymer is stirred and cooled with an inert solid powder such as, say, celite or silica gel, following which a poor solvent of the polymer, such as butyl carbitol, is added to make a slurry of the inert solid powder whose surface is covered with a thin film of the separated polymer.

The slurry is then placed by means of a suitable procedure in a column fractionator (having at its bottom a filter plate of suitable material provided with perforations of suitable size, such as a glass filter) heater to 160° C., following which a mixture of a good solvent and a nonsolvent or a suitable poor solvent, such as, for example, butyl carbitol-tetralin mixture, is flowed from the top at a prescribed rate, and thereafter the polymer is separated from the outflowing liquid by means of a suitable method and then dried, this being made one of the fractions. This fractionation is conducted at a prescribed temperature (160° C.), and the proportion of the good solvent such as tetralin is gradually increased. It is a known fact in the art that by this method of gradient elution fractionation the polymers are fractionated in order of their molecular weight.

As a result of having obtained the ethylene-propylene compositions of the six fractions fractionated by the above method by the infrared analysis method (obtained from the ratio of absorbances between 13.9 microns and 10.3 microns and the calibration curve being prepared by using a blend of polypropylene and polyethylene), five of the fractions were polymers which contained about 100% by weight of propylene (hereinafter indicate as 1) while the final fraction with the highest molecular weight contained about 50–80% by weight of ethylene. The fractions which contained about 100% by weight of propylene exhibited a crystallinity of about 60–70% by the X-ray method [G. Natta, Attiaccad. nazl. Lincei. Rend Classes Sci. Fis. mat e nat, vol. 22, p. 11 (1957)].

Next, the fraction with the highest molecular weight was fractionated by crystallinity by means of method of rising temperature fractionation, a known method in the art. This method is described fully by P. W. O. Wijga in Makromolekulale Chemie, vol. 36, p. 115 (1960). Namely, when, this time, only a good solvent such as tetralin is caused to flow down through the column fractionator packed with a slurry prepared as perviously described and the column temperature is progressively raised, for example, such as in the manner of 100° C., 110° C., 120° C. and 125° C., the polymer is fractionated by crystallinity. When the fraction with the highest molecular weight was fractionated in this manner by crystallinity, a fraction having an ethylene content of about 10–70% by weight and in which were observed propylene crystals (hereinafter indicated as 2) and a fraction (hereinafter indicated as 3) in which was observed about 4–10% by weight of propylene, but no crystals of propylene by means of the infrared analysis but which showed about 50–60% by weight of polyethylene crystals by the X-ray method [J. L. Matthews et al., Acta Cryst., vol. 2, p. 85 (1949)] were obtained, fraction (3) being obtained at all times at a lower temperature than fraction (2).

Therefore, fraction (1) is a crystalline propylene homopolymer while fraction (3) is a crystalline ethylene-propylene random copolymer whose content of propylene is about 4–10% by weight.

Next, for determining the structure of fraction (2), the answer as to whether or not it contains a crystalline propylene homopolymer was obtained by means of the turbidimetric titration method such as described below.

Namely, to a polymer dissolved in a good solvent such as, say, tetralin maintained at a prescribed temperature (115° C.) is added at a constant rate a poor solvent such as butyl Cellosolve maintained at the same temperature. Then when a light is beamed against this system and the increase in the diffused light is determined by a suitable method, a knowledge as to the initial cloud point, i.e., the point at which the polymer first starts to precipitate, can be obtained. According to this method, the volume fraction of the poor solvent butyl Cellosolve at the initial cloud point is about 30% in the case of crystalline polyethylene, about 90% in the case of crystalline propylene and the two points of about 30% and about 90% in the case of a mixture of the two. Now, the initial cloud point of the foregoing fraction (2) was only a single point between about 40–60%, though some differences existed depending upon the ethylene content. From this fact, it is definite that no crystalline propylene homopolymer is contained in fraction (2).

When the foregoing results and the polymerization method of the present invention are considered together, it is apparent that fraction (2) is a block copolymer which comprises a crystalline polypropylene chain to which at one end is bonded an ethylene-propylene random copolymer.

Further, while the proportion of these three classes of polymers will differ depending upon the ethylene content of the polymer formed, it is believed that they are contained in the range of about 95–60% by weight for the crystalline propylene homopolymer, about 1–20% by weight for the block copolymer comprising a crystalline polypropylene chain to which at one end is bonded an ethylene-propylene random copolymer, and about 3–35% by weight for the crystalline ethylene-propylene random copolymer.

Further, the results of an investigation of the properties of the modified polymer obtained showed that a modified propylene polymer having much better properties is obtained when, as hereinbefore described, the intrinsic viscosity of the so-called polyethylene and copolymer fractions is greater than that of the crystalline propylene homopolymer fraction.

Further, for purpose of comparing with the modified polymer obtained by the invention process, polymers having these three classes of molecular chains were polymerized separately using the same catalyst as in the present invention. The powders of these polymers were then dry-blended so as to have the same melt index and ethylene content as the sample of Experiment 3 of Example 1. When this was mixed and kneaded in an extruder, the blend obtained exhibited a brittle temperature of 10° C. and a softening point of 145° C. Thus, it was found from the results obtained in the example of the present invention (brittle temperature —26° C., softening point 145° C.) that the polymers separately obtained, as described hereinabove, were definitely inferior in their effects of improving the properties of the polymer.

Therefore, it is apparent that the polymer obtained by the invention process has a polyblend (multiblend) form which exhibits properties which are completely unique as compared with the polymer obtained by the usual method of blending polymers.

In addition, the process of the present invention provides numerous commercially valuable production processes.

First, there is provided a polymerization process which has a catalytic efficiency (indicated by the number of grams of solid polymer formed per gram of titanium trichloride) substantially similar to the instance of producing crystalline polypropylene, and moreover which provides a polymer having greatly improved properties.

According to the invention process, it is possible to form a solid polymer having a catalytic efficency of 300–800 grams. Furthermore, its effect of improving the properties is better than the pure block copolymer and the polymer whose proportion of block copolymer is relatively great (Experiments 1 and 2 of Example 1).

This is a fact which was completely unexpected, and it is apparent that this also has great significance commercially when the two aspects of polymer properties and the cost of the catalyst are considered.

Secondly, there is provided a process of initiating the polymerization of ethylene (or propylene) in the presence of unreacted propylene (or ethylene).

This not only has the advantage of simplifying the operation of completely purging the unreacted propylene (or ethylene) prior to the polymerization of the ethylene (or propylene), but also that, as compared with the instance when the unreacted propylene is completely purged prior to the polymerization of the ethylene, a polymer is obtained, the effects of whose improvement in properties are also superior, as shown by Example 3.

Hence, according to this invention, the foregoing ethylene polymerization stage is preferably carried out in the presence of 5–20% by volume of propylene.

Thirdly, the present invention provides a polymerization process wherein the yield of the solid crystalline polymer is raised by curtailing the formation of solvent-soluble polymer, the operations of transporting and centrifuging the reaction product during the stage in which the solid polymer is recovered from the polymeric slurry is simplified, and a polymer is produced, the effects of whose improvement in properties are superior.

Further, the invention process can also be carried out continuously by polymerizing the propylene and ethylene in separate reactors.

For a clearer understanding of the present invention, the following examples are given, which are merely in illustration of the invention and not in limitation thereof.

The numerical values indicated in the examples were obtained in the following manner.

Catalytic efficiency—The number of grams of solid polymer formed per gram of titanium trichloride.
Ethylene content—Infrared spectrum analysis.
Specific gravity—ASTM Method D–1505–57T.
Melt index—ASTM Method D–1238–57T. Temperature 230° C., load 2160 grams.
[$\eta$] Intrinsic viscosity—135° C., Tetralin.
Brittle temperature—ASTM Method D–746–57T.
Impact strength—Falling ball impact test. Improved method of BS 1524–1955. Test piece 2-mm. thick sheet, measurement temperature —40° C.
Vicat softening point—ASTM Method D–1525–58T.
Stiffness—ASTM Method D–747–50.

EXAMPLE 1

For illustrating the superiority in the effects of improvement in properties of the polymer formed at a catalytic efficiency above 300 grams, the following four experiments are shown.

A stirrer-equipped 100-litre autoclave was charged with 40 g. of finely divided titanium trichloride containing aluminum (AA grade, product of Stauffer Co.) and 80 g. of diethylaluminum monochloride, along with 45 litres of n-heptane.

Then the feeding of propylene was started, the polymerization reaction being continued until the prescribed amount of propylene was fed under the conditions of a temperature of 65° C., maximum pressure of 6 atmospheres (only Experiment 1 being 3 atmospheres) and a hydrogen concentration of 3% (only Experiment 1 being zero percent).

The unreacted propylene was purged to 0.5 atmosphere (only Experiment 1 being normal pressure), after which the polymerization reaction of ethylene was continued under the conditions of a temperature of 65° C., maximum pressure of 3 atmospheres (only Experiment 1 being 1.5 atmospheres) until the content of ethylene in the several polymers reached about 12% by weight, based on total polymer weight. The gas composition of the vapor phase portion of the autoclave 10 minutes after the start of the ethylene polymerization was ethylene 75–80% and propylene 25–20%, in all four of the experiments.

The polymerization reaction was stopped by adding 3 litre of butanol to the polymeric slurry obtained. Then, after a decomposition operation of the catalyst for 2 hours at 70° C., the centrifuging, washing with water and drying of the polymer was carried out. The yields and properties of the polymers obtained in the several experiments are shown in Table I.

It is apparent from this table that the invention process (Experiments 3 and 4) brought about a prolongation of the polymerization time as a result of an enhancement in the catalytic efficiency, and thus as a matter of course the proportion of the formation of homopolymers other than the pure block copolymers becomes greater, but the effects of improvement in properties of the polymer obtained were especially marked.

TABLE I

| Experiment | Propylene polymerization time, min. | Ethylene polymerization time, min. | Yield of solid polymer, kg. | Catalytic efficiency g./g.-TiCl₃ | Ethylene content, wt. percent | Melt index | [$\eta$] | Brittle temperature ° C. | Impact strength, kg.-cm. | Vicat softening point °C. | Stiffness, kg./cm.² |
|---|---|---|---|---|---|---|---|---|---|---|---|
| 1 | 30 | 12 | 2.3 | 58 | 11.9 | 0.63 | 2.68 | −11 | 80 | 138 | 7,120 |
| 2 | 60 | 25 | 5.7 | 142 | 12.2 | 1.57 | 2.35 | −16 | 130 | 142 | 8,530 |
| 3 | 150 | 70 | 16.3 | 408 | 12.0 | 1.54 | 2.30 | −26 | 250 | 145 | 8,220 |
| 4 | 210 | 120 | 20.6 | 515 | 11.4 | 1.62 | 2.28 | −24 | 250 | 146 | 8,370 |

EXAMPLE 2

The following six experiments are given for illustrating that when the ethylene content of the modified propylene polymer, the end product of this invention, becomes 5% or more by weight, it exhibits and excellent brittle temperature and impact strength.

Except that the propylene polymerization time in the several experiments was set at 3 hours, and the ethylene polymerization time and the hydrogen concentration during the propylene polymerization were varied so that the ethylene contents of the several polymers and the melt indexes would become the prescribed values, otherwise the experiments were conducted under identical polymreization coinditions as in Example 1.

The yields and properties of polymers obtained by the several experiments are shown in Table II.

Further, when 12% of the crystalline ethylene-propylene radom copolymer containing about 5% by weight of propylene, which was polymerized using the catalyst system of the present invention, was blended with the polymer of Experiment 5 to make a blend containing 12.2% by weight of ethylene, its brittle temperature became −5° C. Thus, the effects of improvement in properties obtained were clearly inferior to that of the polymer of Experiment 3 of the present invention.

ments 3 and 4), a polymer having a high softening point and stiffness cannot be obtained after all, even though the treatment conditions of the resulting polymeric slurry were changed.

EXAMPLE 4

This example shows that in practicing the invention process, ethylene can be polymerized first.

A stirrer-equipped 3-litre autoclave was charged with 1.2 g. of finely divided titanium trichloride containing aluminum and 2.4 g. of diethylaluminum monochloride, along with 1.5 litres of n-heptane.

TABLE II

| Experiment | Yield of solid polymer, kg. | Catalytic efficiency g./g.-TiCl$_3$ | Ethylene content, wt. percent | Hydrogen concentration during propylene polymerization, percent | Melt index | [η] | Specific gravity | Brittle temperature, °C. | Impact strength, kg.-cm. | Vicat softening temperature, °C. | Stiffness, kg./cm.$^2$ |
|---|---|---|---|---|---|---|---|---|---|---|---|
| 1 | 18.2 | 455 | 27.5 | 7.0 | 0.52 | 2.80 | 0.9148 | −60 | >700 | 132 | 6,050 |
| 2 | 16.5 | 413 | 18.4 | 4.5 | 1.13 | 2.63 | 0.9115 | −42 | 500 | 136 | 6,830 |
| 3 | 16.0 | 400 | 12.5 | 2.8 | 1.20 | 2.46 | 0.9088 | −30 | 320 | 142 | 7,820 |
| 4 | 15.2 | 380 | 6.3 | 2.0 | 1.17 | 2.50 | +0.9075 | −11 | 50 | 145 | 8,500 |
| 5 | 14.6 | 365 | 2.1 | 1.0 | 1.0 | 2.60 | 0.9007 | +6 | <5 | 147 | 8,810 |
| 6 | 14.2 | 355 | 0 | 0.8 | 1.05 | 2.57 | 0.9070 | +15 | <5 | 147 | 9,030 |

Note.—Experiments 5 and 6 in Table II, above, are those in which the ethylene content in the polymer is outside the range specified by the present invention. They have been given as comparison.

EXAMPLE 3

The following three experiments are given for illustrating that there exists an optimum range for the gas composition during the time ethylene is polymerized in the polymerization process according to the present invention.

A stirrer-equipped 3-litre autoclave was charged with 1.2 g. of finely divided titanium trichloride containing aluminum and 2.4 g. of diethylaluminum monochloride, along with 1.5 litres of n-heptane and 900 cc. of hydrogen.

The feeding of the propylene was started and the polymerization reaction was carried out for 2.5 hours under the conditions of 60° C. and 6 atmospheres. The unreacted propylene was purged to the prescribed pressure, and then the polymerization of ethylene was continued under the conditions of 60° C. and 3 atmospheres until the ethylene content became about 12% by weight, based on the total weight of the polymer.

Next, the polymeric slurry obtained was treated with butanol, as in Example 1, in the case of Experiments 1, 2 and 3 of Table III, below, whereas in the case of Experiment 4 of the same table, the polymeric slurry was treated with methanol, and thus the respective polymers were obtained.

The feeding of the ethylene was started and the polymerization reaction continued for 1 hour under the conditions of 60° C. and 3 atmospheres. Then the polymerization of propylene was continued for 3 hours under the conditions of 60° C. and 6 atmospheres, in the presence of unreacted ethylene. Further, after 10 minutes from the start of the polymerization of propylene, 1200 cc. of hydrogen was introduced into the autoclave. The resulting polymeric slurry was treated by the procedure described in Example 1. The yield of solid polymer obtained was 485 g., its ethylene content, 13.2% by weight, melt index, 0.69, brittle temperature, −26° C., impact strength, 250 kg.-cm., Vicat softening point, 143° C. and stiffness, 7950 kg./cm.$^2$.

EXAMPLE 5

The following two experiments are given to clarify the structure of the polymer obtained by the polymerization process according to the present invention.

Structural analyses in accordance with the previously indicated methods were made of a polymer produced as described in Experiment 2 of Example 2 except that the ethylene content in the polymer was varied somewhat (this polymer being indicated as (A)) and a polymer pro-

TABLE III

| Experiment | Solid polymer A, g. | Catalytic efficiency, g./g.-TiCl$_3$ | Polymer B dissolved in solvent, g. | Rate present of propylene during polymerization of ethylene, percent | | Ethylene content, wt. percent, of— | | Melt index | Brittle temperature, °C. | Impact strength, kg.-cm. | Vicat softening point, °C. | Stiffness, kg./cm.$^2$ |
|---|---|---|---|---|---|---|---|---|---|---|---|---|
| | | | | 10 min. after start of feeding | At the completion of feeding | A | B (ca.) | | | | | |
| 1 | 493 | 410 | 20 | 21 | 8 | 12.0 | 10 | 1.02 | −35 | 340 | 142 | 7,960 |
| 2 | 476 | 396 | 18 | 0 | 0 | 21.1 | 10 | 0.95 | −30 | 300 | 142 | 8,030 |
| 3 | 447 | 372 | 105 | 63 | 20 | 3.5 | 50 | 2.36 | −2 | 20 | 145 | 8,430 |
| 4 | 510 | 425 | 42 | 63 | 20 | 9.6 | 40 | 3.88 | −21 | 220 | 138 | 6,170 |

Experiment 4 in Table III, above, was conducted for the purpose of investigating how the properties of the resulting polymer, as compared with Experiment 3, would be improved when the treatment conditions of the polymeric slurry were changed. The following fact can be comprehended from the various results of Experiment 4. Namely, when the propylene content is greater than the range specified by the present invention (0–25% by volume) during the ethylene polymerization reaction (cf. Experiduced by the same procedure except that about 20% of hydrogen was introduced after 20 minutes from the start of the polymerization of ethylene (this polymer being indicated as (B)). The results obtained are shown in Table IV.

In this case, polymer A had a brittle temperature of −36° C. and a softening point of 139° C., while polymer B had a brittle temperature of −30° and a softening point of 142° C.

TABLE IV

|  | Proportion to whole polymer, wt. percent | | $[\eta]$ | | Ethylene content of each fraction, wt. percent | |
| --- | --- | --- | --- | --- | --- | --- |
|  | Sample A | Sample B | Sample A | Sample B | Sample A | Sample B |
| Fraction obtained by gradient dilution fractionation: | | | | | | |
| Polymer before fractionation |  |  | 2.54 | 1.91 | 16.0 | 16.7 |
| M-1 | 8.7 | 8.2 | 0.18 | 0.16 | 0 | Trace. |
| M-2 | 14.2 | 13.4 | 0.37 | 0.35 | 0 | Do. |
| M-3 | 10.9 | 13.2 | 0.66 | 0.70 | 0 | Do. |
| M-4 | 24.2 | 23.6 | 1.34 | 1.50 | 0 | Do. |
| M-5 | 19.8 | 20.0 | 2.39 | 2.42 | 0 | Do. |
| M-6 | 2.22 | 21.6 | 6.04 | 4.41 | ¹72 | ¹77 |
| Fraction obtained by rising temperature fractionation of fraction M-6 and extraction temperature: | | | | | | |
| 105° C. [M-6-1] | 11.3 | 15.0 | 6.75 | 4.18 | ¹95 | ¹95 |
| 115° C. [M-6-2] | 10.9 | 6.6 | 5.27 | 4.64 | ¹45 | ¹30 |
| Composition of the three classes of polymers: | | | | | | |
| (a) | 77.8 | 78.4 | 1.20 | 1.27 | 0 | 0 |
| (b) | 10.9 | 7.6 | 6.75 | 4.18 | ¹45 | ¹30 |
| (c) | 11.3 | 15.0 | 5.27 | 4.64 | ¹95 | ¹95 |

¹ About.

NOTE.—(a) Crystalline polypropylene homopolymer. (b) Block copolymer comprising a crystalline polypropylene chain to which one at end is bonded an ethylene-propylene random copolymer. (c) Crystalline ethylene-propylene random copolymer.

EXAMPLE 6

The following three experiments are given for illustrating that it is preferred in the copolymer obtained by the polymerization process of this invention for the intrinsic viscosity of the polymer to be greater during the polymerization of the ethylene than during the polymerization of the propylene.

In the three experiments, the polymerization time and hydrogen concentration were varied and so adjusted that the catalytic efficiency, the ethylene content and the intrinsic viscosity of the final polymer would become about the same. Other conditions of the polymerization reaction were about identical with those of Experiment 3 of Example 1.

The chief polymerization conditions of the several experiments and the properties of the resulting polymers are shown in Table V. As to the intrinsic viscosity of the polymer during the polymerization of the propylene, this was measured in the following manner. A small amount of a slurry of polypropylene was drawn from the autoclave immediately prior to the start of the polymerization of the ethylene. This slurry, which was purified by means of a treatment method identical to that which the final polymeric slurry receives, was measured for its intrinsic viscosity.

TABLE V

|  | Experiment | | |
| --- | --- | --- | --- |
|  | 1 | 2 | 3 |
| Propylene polymerization time, min | 150 | 170 | 170 |
| Ethylene polymerization time, min | 70 | 85 | 110 |
| Yield of solid polymer, kg | 16.5 | 16.0 | 16.3 |
| Catalytic efficiency, g./g.-TiCl₃ | 412 | 400 | 408 |
| Ethylene content, wt. percent | 15.9 | 16.1 | 16.0 |
| Hydrogen concentration during propylene polymerization, vol. percent | 4.2 | 3.5 | 2.8 |
| Hydrogen concentration during ethylene polymerization after 10 minutes from start of polymerization vol. percent | (¹) | (²) | (²) |
| η of propylene polymer portion | 1.70 | 2.13 | 2.74 |
| Melt index of propylene polymerization portion | 7.0 | 2.3 | 0.78 |
| η of final polymer | 2.65 | 2.60 | 2.68 |
| Melt index of final polymer | 1.0 | 1.1 | 1.0 |
| Brittle temperature, °C | −37 | −34 | −15 |
| Impact strength, kg.-cm | 430 | 380 | 70 |
| Vicat softening point, °C | 141 | 141 | 142 |
| Stiffness, kg./cm.² | 7,170 | 7,209 | 7,480 |

¹ Not added.
² About.

We claim:

1. A process for producing modified propylene polymer which comprises as a first step polymerizing a member selected from the group consisting of propylene and ethylene and subsequently polymerizing continuously in the same system the other member of said group in an inert hydrocarbon solvent at a temperature of 30–100° C. at a pressure of from 1 to 10 atmospheres utilizing as the catalyst dialkylaluminum monohalide and titanium trichloride; characterized in that polymerization of ethylene or propylene in said subsequent step is initiated in the presence of unreacted propylene or ethylene from the first step so that reaction of ethylene is effected in the presence of an average amount of from 5 to 25% by volume of propylene in the vapor phase, the amounts of ethylene and propylene fed to the reaction system being adjusted so that the resulting modified propylene polymer contains from 5 to 40% by weight ethylene, the overall polymerization reaction being so conducted that at least 300 parts by weight of polymer is formed per one part by weight of the titanium trichloride; and then separating a modified propylene polymer consisting essentially of (a) a crystalline polypropylene,
(b) a block copolymer wherein a propylene-ethylene random copolymer is blocked to said crystalline polypropylene, and,
(c) a crystalline ethylene-propylene random copolymer having an ethylene content of more than about 90% by weight from the hydrocarbon solvent.

2. A process according to claim 1 wherein the dialkylaluminum monohalide is diethylaluminum monochloride.

3. The process according to claim 1 wherein the polymerization reaction is so conducted that the intrinsic viscosity of the polymer obtained by polymerizing ethylene in the presence, as an average value during the polymerization, of 5–25% by volume of propylene is greater than the intrinsic viscosity of the polypropylene obtained by polymerizing propylene in the absence of ethylene.

4. The process according to claim 1 wherein the adjustment of the intrinsic viscosity of the polypropylene is effected by the introduction of hydrogen.

5. The product produced by the process of claim 1.

References Cited

UNITED STATES PATENTS

| 3,200,173 | 8/1965 | Schilling | 260—878 |
| 3,358,056 | 12/1967 | Renaudo | 260—878 |
| 3,401,212 | 9/1968 | Griffin | 260—878 |

JOSEPH L. SCHOFER, Primary Examiner

A. HOLLER, Assistant Examiner

U.S. Cl. X.R.

260—88.2 R, 878 R